United States Patent [19]

Chase, Jr.

[11] Patent Number: 4,463,452
[45] Date of Patent: Jul. 31, 1984

[54] TRACKING AND TELEMETRY SYSTEM FOR SEVERE MULTIPATH ACOUSTIC CHANNELS

[75] Inventor: Jay V. Chase, Jr., Poulsbo, Wash.

[73] Assignee: The United States of America as represented by the Secretary of the Navy, Washington, D.C.

[21] Appl. No.: 417,784

[22] Filed: Sep. 13, 1982

[51] Int. Cl.³ ............................................. H04B 11/00
[52] U.S. Cl. ..................................... 367/134; 367/901
[58] Field of Search ........................ 367/133, 134, 901

[56] References Cited

U.S. PATENT DOCUMENTS 3,289,152 11/1966 McIlwraith et al. ............... 367/134
3,742,440 6/1973 Ehrlich et al. ...................... 367/134

Primary Examiner—Richard A. Farley
Attorney, Agent, or Firm—R. F. Beers; C. D. B. Curry; W. C. Daubenspeck

[57] ABSTRACT

A modulation/signal processing technique for acoustic communication in shallow water. Digital information is transmitted in a time expended version of frequency shift keying where a tone burst at a first frequency represents a logical zero and a tone burst at a second frequency represents a logical one. There is a long quiet time between bits to allow multipath interference to decay. A relative energy detector with a fast attack/slow decay circuit for Doppler compensation is used to receive the transmitted tone bursts and reproduce a digital data train equivalent to the transmitted pulse train. A single communication channel employs two frequencies to transmit an identity code as a signal validating and identification method and two frequencies to simultaneously transmit telemetry data.

8 Claims, 11 Drawing Figures

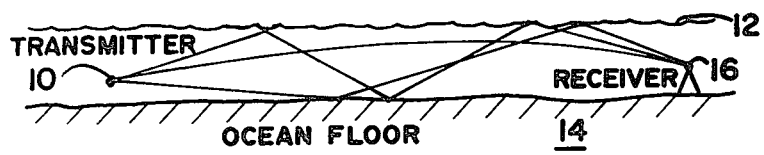
FIG _ 1a
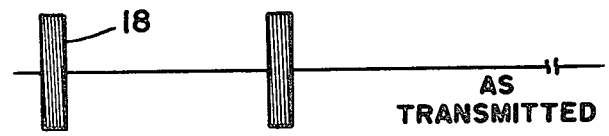
FIG _ 1b
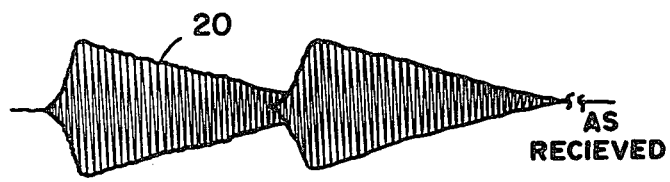
FIG _ 1c
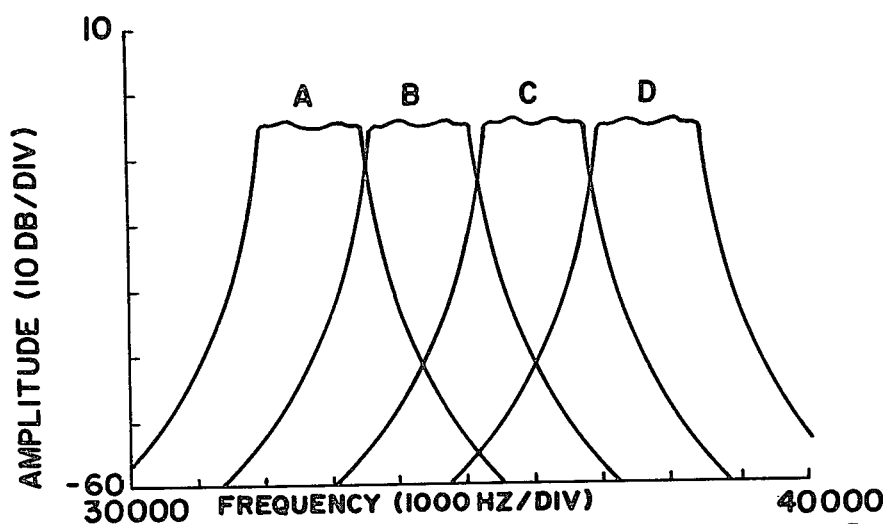
FIG _ 2
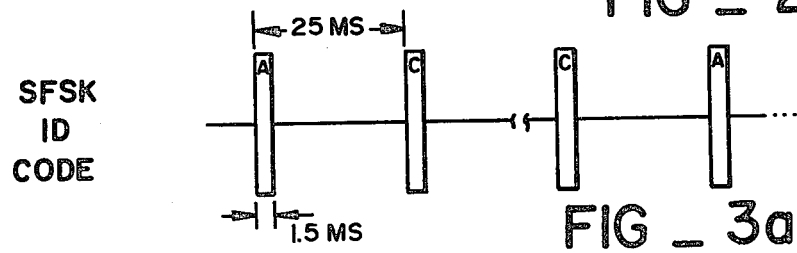
FIG _ 3a
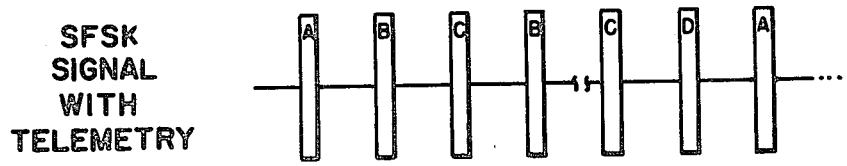
FIG _ 3b

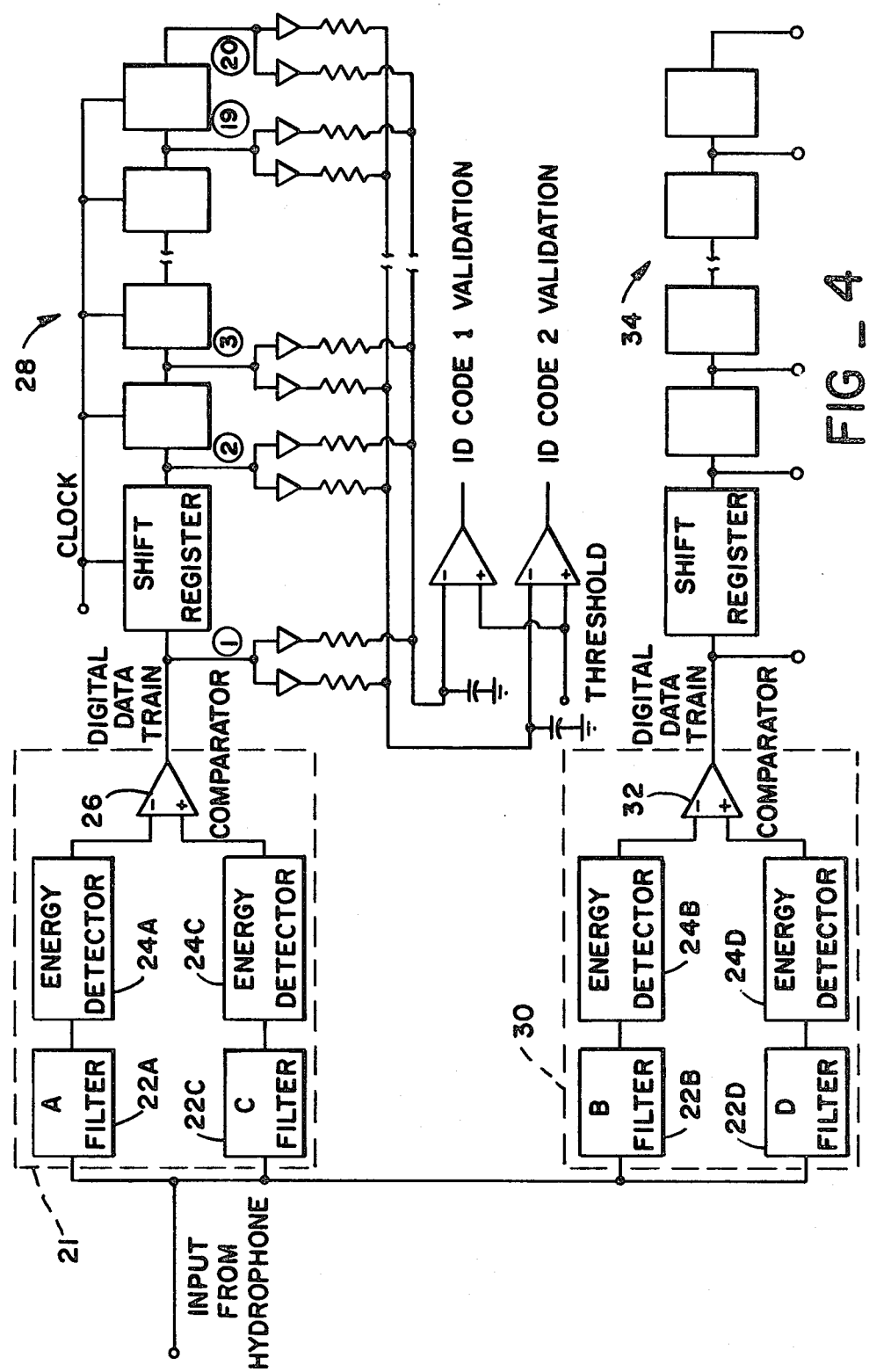

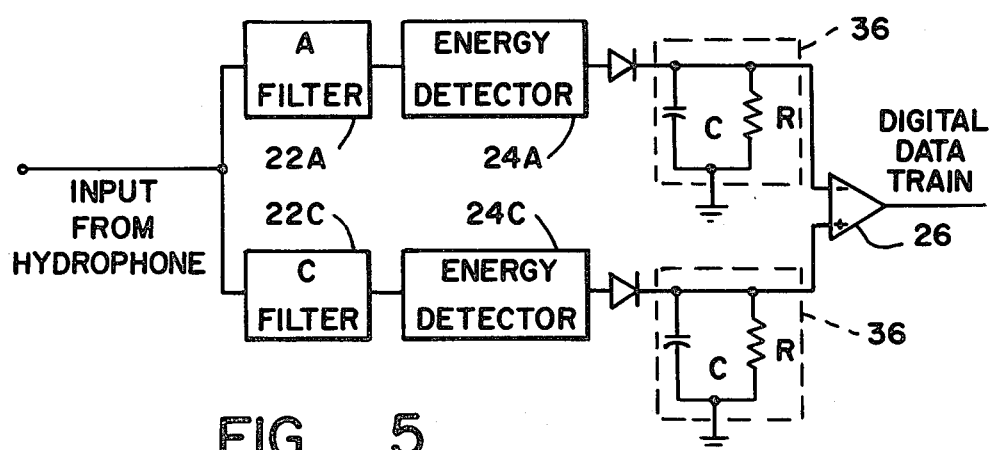
FIG _ 5
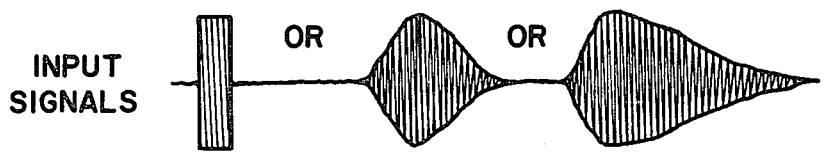
FIG _ 6a
FIG _ 6b
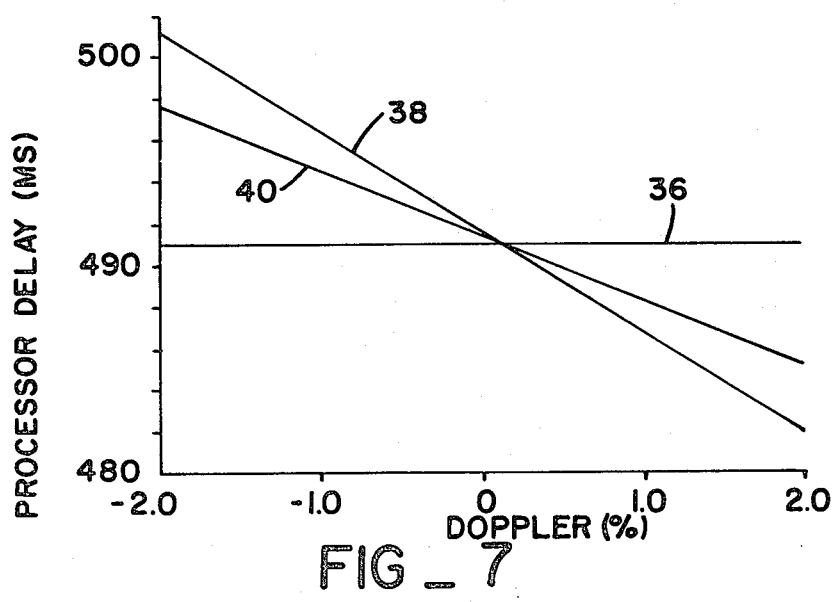
FIG _ 7

TRACKING AND TELEMETRY SYSTEM FOR SEVERE MULTIPATH ACOUSTIC CHANNELS

BACKGROUND OF THE INVENTION

1. Field of the Invention

The present invention relates in general to underwater communication and, in particular, to underwater communication in the presence of multipath interference.

2. Description of Prior Art

Tracking, or locating underwater vehicles in real time, is a prime concern in undersea warfare research and testing. Vehicles to be tracked are outfitted with specialized acoustic transmitters and underwater tracking ranges are built by implanting receiving hydrophones on the sea floor. Accurate measurement of travel time of acoustic messages, traveling from the underwater vehicle to the implanted hydrophones, is combined with an effective sound speed to give real-time slant range. Slant range to multiple-implanted hydrophones allows for geometric calculation of vehicle position.

Reliable and effective communication across the acoustic path is the main problem encountered. Temperature variations, reflective surfaces, sea states, and noise (natural and man made) are all dynamic factors that defy precise, real-time characterization, complicating the communications task.

In general, the following are required:

1. Message Validation—Incoming messages must be reliably validated and arrival times measured accurately. Operation at the lowest Signal-to-Noise ratio (or Signal-to-Interference ratio) is required to obtain maximum slant ranges.

2. Message Identity—Validated messages must be identifiable. At any given time the acoustic channel may contain multiple signals that need to be identified as to source.

3. Telemetry—The ability to transmit free-form telemetry across the acoustic channel is desirable.

4. Doppler—For underwater tracking applications, the system must operate at Dopplers produced by high-speed underwater vehicles.

The ability to track underwater vehicles in deep water has existed for some time and deep-water tracking ranges are abundant. Only recently have firm requirements evolved that require the ability to track objects in shallow water where slant ranges, compared to water depth, are very large.

Deep water ranges typically enjoy acoustic paths free from harmful reflective interference. Shallow water implementations usually do not enjoy interference-free acoustic paths. Additionally, in a shallow water tracking range, the underwater vehicles are very near the plane of the implanted hydrophones. In this situation, Z-axis, or depth calculations become indeterminate and if depth is to be known in real time, it must be measured on board the vehicle and telemetered across the acoustic channel. For shallow-water tracking, reliable acoustic telemetry is an absolute requirement.

In shallow water, direct acoustic path propagation seldom exists over any appreciable distance. Long distance transmission of information requires bounce-path propagation. In bounce-path propagation not one but multiple paths exist between the transmitter and receiver. Received signals consist of multiple replicas of the transmitted signal, all overlapping each other and continuing with decaying amplitude.

Constructive and destructive interference of the overlapping signals effectively destroys conventional modulation methods such as On-Off Keying (OOK), Frequency-Shift Keying (FSK), and Phase-Shift Keying (PSK).

SUMMARY OF THE INVENTION

Accordingly it is an object of the present invention to provide reliable underwater communication in the presence of severe multipath interference.

Another object of the present invention is to reliably transmit acoustic telemetry in shallow water.

Another object of the present invention is to provide reliable acoustic communication when Doppler effects are present.

The present invention is a modulation/signal processing method, called Spaced-Frequency-Shift Keying (SFSK) hereinafter, that effectively penetrates severe multipath acoustic channels. SFSK uses a time-expanded version of FSK as a modulation technique and correlation processing of a multibit identity code as a signal validating and identification technique. The time-expanded FSK allows information to cross the severe multipath acoustic channel without interfering with itself. Correlation processing supplies reliable message validation and identification, excellent noise immunity, and enhanced timing performance.

Other objects, advantages, and features of the present invention will become apparent from the following detailed description of the preferred embodiment when considered in conjunction with the accompanying drawings wherein:

BRIEF DESCRIPTION OF THE DRAWINGS

FIGS. 1a–1c illustrate the multipath propagation associated with shallow-water acoustic communication;

FIG. 2 illustrates frequency selection in implementing the present invention;

FIGS. 3a and 3b illustrate the transmit format for an experimental SFSK system;

FIG. 4 is a block diagram illustrating a receiver for the experimental SFSK system;

FIG. 5 is a block diagram illustrating a relative-energy detector having Doppler compensation;

FIGS. 6a and 6b illustrate the operation of the Doppler compensation circuitry; and FIG. 7 illustrates timing curves for Doppler-compensated correlators.

DESCRIPTION OF THE PREFERRED EMBODIMENT

Referring now to the drawings and, in particular, to FIGS. 1a–1c, in shallow water the acoustic signal from a transmitter 10 propagates over multiple bounce paths such as those between the ocean surface 12 and the ocean floor 14 before reaching a receiver 16. The transmitted well-defined tone bursts 18 are degraded by the constructive and destructive interference of the overlapping signals to present multiple decaying signals 20 to the receiver. The present invention is a solution to the problem of acoustic communication in the presence of severe multipath interference such as shown in FIG. 1.

To implement an SFSK system, an available frequency band is chosen and divided into four sub-bands as shown in FIG. 2. Two frequencies, A and C, are used to transmit a multibit identity code in a time-expanded FSK mode. Two frequencies, B and D, are used to transmit telemetry in a time-expanded FSK mode. Considering first the identity code, previous experience has shown that a 20-bit pseudorandom identity code would supply the required noise immunity and processing gain for the tracking system. Frequency A is used to represent a logical zero and frequency C is used to represent a logical one. The multibit identity code is transmitted in a long pulse string with each bit separated by a long quiet time. The transmitted pulse width in an experimental system was chosen twice as long as necessary to pass full amplitude signal through receiver end subband filters, and the spacing between the bits was chosen to allow severe multipath pulses received to decay 6 to 10 dB before the next pulse. The experimental SFSK system used 1.5 ms pulses spaced at 25 ms intervals as illustrated in FIG. 3a.

The telemetry code is transmitted over the acoustic channel in the same manner as the multibit identity code with frequency B representing a logical zero and frequency D representing a logical one. As illustrated in FIG. 3b, because the telemetry frequencies and the identity frequencies are separate and do not interfere with each other, the telemetry bits are interleaved with the identity bits.

It is noted that specific structural details of a transmitter suitable for transmitting the required SFSK pulses have not been included in the description because such transmitters are well known in the art and the details thereof are not essential to an understanding of the invention.

FIG. 4 illustrates apparatus for receiving the SFSK signal. A first relative-energy detector circuit is used to receive the SFSK signal and produce a digital data train that represents the multibit identity code for that portion of the data train equivalent to the transmitted pulse train. A second relative-energy detector circuit is used to receive the SFSK signal and produce a digital data train that represents the telemetry data for that portion of the data train equivalent to the transmitted pulse train.

Considering the detection of the identity code first, the acoustic signals are received by a hydrophone (not shown) and are coupled to a first relative-energy detector 21 having front-end bandpass filters 22A and 22C for passing signals at frequency A and C, respectively. The bandwidths of the filters 22A and 22C must be large enough to pass incoming pulsewidths over the expected range of Doppler shift. The outputs of the filters 22A and 22C are coupled to energy detectors 24A and 24C, respectively. The outputs of the energy detectors 24A and 24C are coupled to a comparator 26 where the energy at frequency A is compared with the energy at frequency C. The output of the comparator 26 is a digital data train having a logical zero when the energy at frequency A is greater and a logical one when the energy at frequency C is greater.

The digital data train from the relative detector 21 is fed into a comb correlator 28 whose taps 1 – 20 are spaced identically to the spacing of the transmitted bits and which examines the incoming data train for a match to the transmitted multibit identity code. The comb correlator 28 can be constructed to search for and identify a number of multibit identity codes allowing for an expanded identification capability. The comb correlator 28 threshold is set to a level which is a compromise between false alarm rate and signal distortion adaptability. The experimental processor threshold was set to allow up to two errors in the multibit identity code input.

The acoustic signals received by the hydrophone are also coupled to a second relative-energy detector 30 having front-end bandpass filters 22B and 22D for passing telemetry signals at frequency B and frequency D, respectively, including the expected range of Doppler shift. The output of the filters 22B and 22D are coupled to energy detectors 24B and 24D, respectively, which are in turn coupled to a comparator 32 to produce a digital data train having a logical zero when the energy at frequency B is greater and a logical one when the energy at frequency D is greater. The received telemetry data train is fed into a long shift register 34.

When correlation occurs in the comb correlator 28, a timing mark is set which represents the time of arrival of the message. With this time known, the optimal time can be established for the pick off of the telemetry data from the telemetry shift register 34.

For applications where the signal source is close to stationary, the system described operates well. For vehicle tracking, significant Doppler can exist which shifts received frequencies and shrinks or expands the received message significantly.

Since the detector 24 is a simple energy detector, frequency shifts can be easily accommodated by selecting appropriate bandwidths for the receiver front-end filters 22.

The problem of shrinkage or expansion of the received message is more significant. When Doppler shrinks or expands the received message, the individual bits of the message no longer line up with the taps of the correlation shift register 28.

Traditional methods of solving this problem are to phase or frequency lock onto the incoming signal and to use the locked signals to adjust the length of the comb correlator 28 to match that of the input message. The nature of the SFSK message, however, is one of widely spaced bits of information and it is very difficult to lock on, or to lock on and hold, a suitable reference.

FIG. 5 shows an alternate approach to Doppler compensation. The input relative energy detector circuitry of FIG. 4 is modified to provide an input signal train that would validate in the comb correlator 28 over the entire Doppler range. A fast-attack/slow-decay circuit 36 is added to each detector to, in effect, stretch each bit to fill in the spaces between the bits at the receiver.

The attack time for each detector is kept as before, commensurate with the rise time of the front-end filters, and the slow-decay time is chosen for an amplitude decay of 6 to 10 dB across the interval between the bits.

It should be noted this tendency to hold a bit decision across the interval between the bits was already inherent in the received signal when severe multipath is present. The detector characteristics are, in essence, matched to the worst-case multipath characteristics of a simple energy detector as illustrated in FIGS. 6a and 6b.

The modified energy detectors detect severe multipath signals faithfully, but in situations where multipath is reduced or nonexistent, the detector provides the pulse stretching necessary to produce filled-in detected data. With the expanded data train bits, the comb correlator tap points 1 – 20 can line up with the input data bits over the full Doppler range of expanded and compressed messages.

Once validation has been assured over the full Doppler range, the time characteristics of the comb correlator 28 need to be considered.

FIG. 7 is a diagram of processor validation time versus Doppler for three types of processors. Curve 36 indicates the timing characteristics of an ideal processor that validates at some constant delay with respect to the first bit of the received message. This type of processor is hard to realize.

Curve 38 represents the ideal timing curve of a truly Doppler compensated comb correlator. If the comb correlator was adjusted in length to exactly match the length of the received message, validation would occur at the precise instant the last bit of the message was received.

Timing curves 36 and 38 are for ideal processors and give correct timing and slant-range calculations. Since a vehicle with Doppler is moving, the slant range is changing and each bit of the SFSK message originates from a different physical location or slant range. A processor with timing curve 1 measures the slant range to the vehicle for the moment the vehicle emits the first pulse of the SFSK message. Curve 38 if for a processor that measures slant range to the vehicle for the moment the vehicle emits the last pulse of the SFSK message.

Further, any straight line curve on the timing diagram represents an ideal Nth pulse processor. Curve 40 indicates the ideal curve of an Nth pulse processor which effectively measures the slant range to a vehicle for the moment it emitted the Nth pulse of its message. The actual processor timing accuracy over Doppler is measured as the best fit to any straight line where that straight line represents an ideal Nth bit processor.

It can be seen that the modulation/signal processing method of the present invention provides reliable message validation, message identification, transfer of binary telemetry, and operation over significant Doppler range in the presence of multipath interference.

Obviously many modifications and variations of the present invention are possible in the light of the above teachings. It is therefore to be understood that within the scope of the appended claims the invention may be practiced otherwise than as specifically described.

What is claimed is:

1. A method of underwater acoustic communication between a transmitting location and a receiving location in the presence of multipath signals, which comprises:
   (a) transmitting a predetermined multibit identity code in a string of individual tone bursts, a logical zero being represented by a tone burst at a first acoustic frequency and a logical one being represented by a tone burst at a second acoustic frequency, the spacing between consecutive identity code tone bursts being chosen to allow multipath signals generated by the earlier tone burst to decay to a noninterfering level before transmission of the following identity code tone burst;
   (b) transmitting data identified by said identity code in a string of individual tone bursts, a logical zero being represented by a tone burst at a third acoustic frequency and a logical one being represented by a tone burst at a fourth acoustic frequency, the spacing between consecutive data tone bursts being chosen to allow multipath signals generated by the earlier data tone burst to decay to a noninterfering level before transmission of the following data tone burst, said data tone bursts being interleaved with said identity code tone bursts;
   (c) receiving the transmitted identity code tone bursts and the transmitted data tone bursts;
   (d) determining whether the received identity code tone bursts represent a logical one or a logical zero;
   (e) correlating said received identity code with said predetermined multibit identity code to identify the identity code which was received;
   (f) determining whether the received data tone bursts represent a logical one or a logical zero; and
   (g) storing the logical value of said data tone bursts, whereby, upon correlation of said identity code, said data is identified by said identity code and is available for further use.

2. A method as recited in claim 1 wherein the step of receiving the transmitted tone bursts comprises receiving said tone burst with a hydrophone.

3. A method as recited in claim 2 wherein the step of determining whether the received identity code tone bursts represent a logical one or a logical zero comprises:
   (a) passing said received tone bursts in parallel through a first bandpass filter having its pass band at said first acoustic frequency and a second bandpass filter having its pass band at said second frequency;
   (b) detecting the energy passing through said first bandpass filter;
   (c) detecting the energy passing through the second bandpass filter; and
   (d) comparing the energy passing through the first bandpass filter with the energy passing through the second bandpass filter to produce a logical zero if the energy passing through the first filter is greater and a logical one if the energy passing through the second is greater.

4. A method as recited in claim 2 wherein the step of determining whether the received data tone bursts represent a logical one or a logical zero comprises:
   (a) passing said received tone bursts in parallel through a third bandpass filter having its pass band at said third acoustic frequency and a fourth bandpass filter having its pass band at said fourth frequency;
   (b) detecting the energy passing through said third bandpass filter;
   (c) detecting the energy passing through the fourth bandpass filter, and
   (d) comparing the energy passing through the third bandpass filter with the energy passing through the fourth bandpass filter to produce a logical zero if the energy passing through the third filter is greater and a logical one if the energy passing through the fourth is greater.

5. A method as recited in claim 3 wherein the step of determining whether the received data tone bursts represent a logical one or a logical zero comprises:
   (a) passing said received tone bursts in parallel through a third bandpass filter having its pass band at said third acoustic frequency and a fourth bandpass filter having its pass band at said fourth frequency;
   (b) detecting the energy passing through said third bandpass filter;
   (c) detecting the energy passing through the fourth bandpass filter; and
   (d) comparing the energy passing through the third bandpass filter with the energy passing through the fourth bandpass filter to produce a logical zero if the energy passing through the third filter is greater and a logical one if the energy passing through the fourth is greater.

6. A method as recited in claim 4 wherein the step of correlating said received identity code with said predetermined multibit identity code to identify the identity code which was received comprises:
   (a) applying the logical ones and zeros produced by said comparison of energy from said first and second bandpass filters to a comb correlator having taps spaced identically to the spacing between consecutive transmitted identity code tone bursts, said comb correlator examining the incoming ones and zeros for a match for said predetermined identity code.

7. A method as recited in claim 6 wherein the step of storing the logical value of said data tone bursts comprises storing said logical value in a shift register.

8. A method as recited in claim 2 further including a method for Doppler compensation, wherein the step of determining whether the received identity code tone bursts represent a logical one or a logical zero comprises:
   (a) passing said received tone bursts in parallel through a first bandpass filter having its pass band centered at said first acoustic frequency and large enough to pass the incoming tone bursts over the expected range of Doppler shift and through a second bandpass filter paving its pass band centered at said second acoustic frequency and large enough to pass the incoming tone bursts over the expected range of Doppler shift;
   (b) detecting the energy passing through said first bandpass filter;
   (c) detecting the energy passing through the second bandpass filter; and
   (d) passing the output of said first bandpass filter through a first fast attack/slow decay circuit;
   (e) passing the output of said second bandpass filter through a second fast attack/slow decay circuit;
   (f) comparing the energy passing through the first fast attack/slow decay circuit with the energy passing through the second fast attack/slow decay circuit to produce a logical zero if the energy passing through the first circuit is greater and a logical one if the energy passing through the second circuit is greater; and wherein the step of determining whether the received data tone bursts represent a logical one or a logical zero comprises:
   (a) passing said received tone bursts in parallel through a third bandpass filter having its pass band centered at said third acoustic frequency and large enough to pass the incoming tone bursts over the expected range of Doppler shift and through a fourth bandpass filter having its pass band centered at said fourth acoustic frequency and large enough to pass the incoming tone bursts over the expected range of Doppler shift;
   (b) detecting the energy passing through said third bandpass filter;
   (c) detecting the energy passing through the fourth bandpass filter;
   (d) passing the output of said third bandpass filter through a third fast attack/slow decay circuit;
   (e) passing the output of said fourth bandpass filter through a fourth fast attack/slow decay circuit; and
   (f) comparing the energy passing through the third fast attack/slow decay circuit with the energy passing through the fourth fast attack/slow decay circuit to produce a logical zero if the energy passing through the third circuit is greater and a logical one if the energy passing through the fourth circuit is greater.

* * * * *